United States Patent Office 2,947,671
Patented Aug. 2, 1960

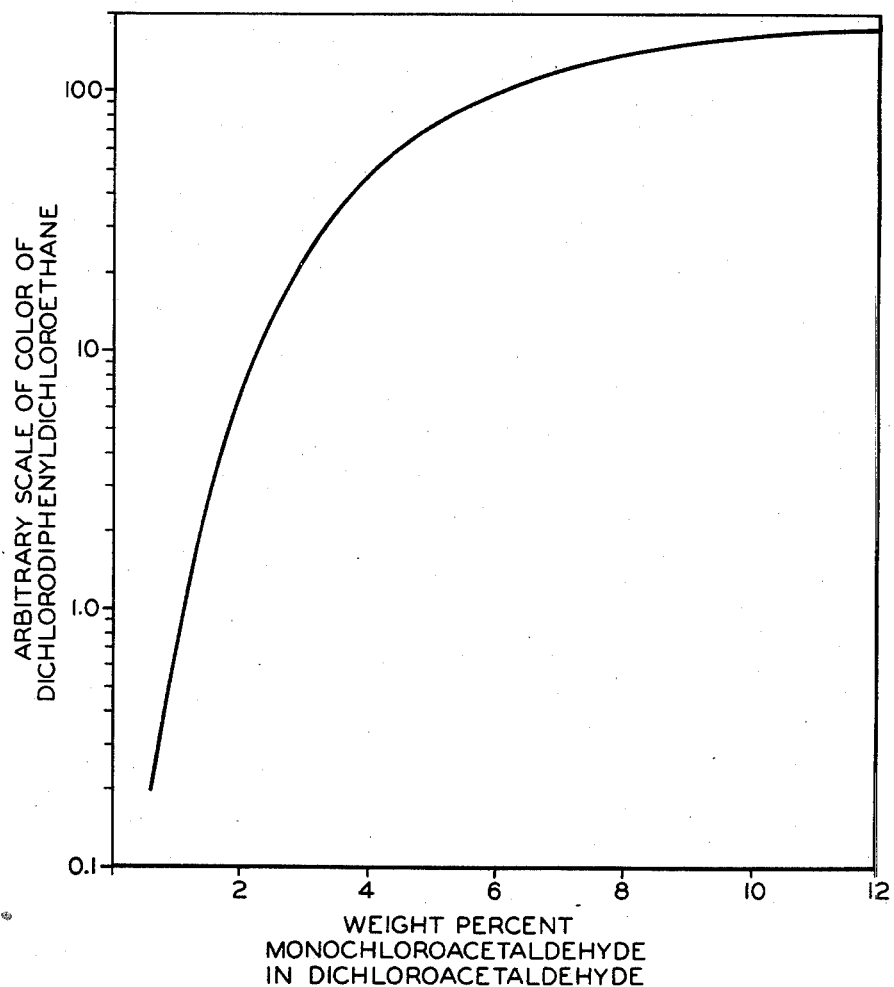

2,947,671

PURIFICATION OF DICHLOROACETALDEHYDE

Benjamin Veldhuis, Morristown, and Robert J. Du Bois, Morris Plains, N.J., assignors to Allied Chemical Corporation, New York, N.Y., a corporation of New York Filed June 23, 1958, Ser. No. 743,887

7 Claims. (Cl. 202—57)

This invention relates generally to the production of purified dichloroacetaldehyde and more specifically to a method of purifying crude dichloroacetaldehyde by the separation therefrom of underchlorinated materials; e.g., acetaldehyde and monochloroacetaldehyde.

Dichloroacetaldehyde is of use as an intermediate in the production of chloral. Of greater importance is its use in quantity for producing the insecticide, dichlorodiphenyldichloroethane (TDE), by the condensation of dichloroacetaldehyde with chlorobenzene in the presence of sulfuric acid.

Some means for improving the color, set point and millability of the insecticide TDE has been sought in the art for some time. One suggested improvement comprises increasing the acid strength of the medium in which occurs the usual condensation of dichloroacetaldehyde with chlorobenzene, whereby TDE is presently produced. Such increase of acid strength does produce TDE having a higher set point, but this is achieved at the expense of TDE yield. In an attempt to improve the color of the finished TDE, activated clays such as "Tonsil" or "Super-Filtrol" have been employed in treating the TDE product produced. Use of a clay obviously entails an additional production cost due to the cost of such material, the consumption of additional time for properly admixing the clay in each batch, and since the clay must be removed ultimately, there is also entailed the cost of a filter, and additional time consumed in performance of the filtration.

It has now been observed that, in general, the purer the dichloroacetaldehyde used in the condensation reaction, the higher the quality of the TDE produced. More specifically, the lower the content of underchlorinated materials (acetaldehyde and monochloroacetaldehyde) normally present in commercially obtainable crude dichloroacetaldehyde, the better the color of the TDE produced therefrom. One explanation offered for such results is that the underchlorinated materials present are charred during the condensation of dichloroacetaldehyde and chlorobenzene, and the discoloration due to this charring persists in the finished TDE. Whatever the reason may be, it has been observed that the color of the TDE produced from dichloroacetaldehyde depends upon the underchlorinated content of the latter.

A method for purifying crude dichloroacetaldehyde (DCA) containing underchlorinated components has also been sought. Certain impurities, such as hydrates, acetals, alcoholates, the overchlorinated component chloral, and the like, can be removed by dehydration and fractionation technique. However, a problem is set by the fact that one of the most serious underchlorinated impurities is monochloroacetaldehyde (MCA), which has a boiling point only 3° C. below that of dichloroacetaldehyde. Hence, the impracticability of a direct distillation of DCA to remove MCA is readily apparent. For example, the requisite distillation column for adequate separation of DCA and MCA would have to be uneconomically large. While the relative volatility of the two aldehydes can be increased by distilling under vacuum, too expensive an operation would be entailed even with this improvement.

In consideration of the foregoing, it is a primary object of the present invention to provide a process for effectively purifying crude dichloroacetaldehyde of underchlorinated materials.

It is another object of this invention to provide a process for purifying crude dichloroacetaldehyde with a minimum reduction of yield of purified product.

A further object of the invention is to devise such a process that does not necessitate the use of fractional distillation techniques.

Another object of the invention is to provide a process for purifying crude dichloroacetaldehyde that may be performed in conventional apparatus with little or no change therein.

Another important object of the invention is to provide a process for producing purified dichloroacetaldehyde that is particularly useful in the preparation of di(parachlorophenyl)dichloroethane in high yield, of light color, high set point, and good millability.

Further objects and advantages of the invention will be apparent from the following detailed description.

Generally, the invention resides in our discovery that crude dichloroacetaldehyde comprising a minor amount of underchlorinated materials may be purified by admixing the crude material with an acid of the group consisting of sulfuric acid, para toluene sulphonic acid, ortho toluene sulphonic acid, and meta toluene sulphonic acid, and thereafter recovering purified dichloroacetaldehyde from the mixture comprising the crude dichloroacetaldehyde and the acid by distillation.

It is likely that the admixing with, and distillation from, sulfuric acid, para toluene sulphonic acid, ortho toluene sulphonic acid, or meta toluene sulphonic acid, of the crude DCA results in an aldol-type condensation which polymerizes the MCA (and possibly a small percentage of DCA) to non-volatile products that remain in the distillant body while the volatile monomeric DCA (and chloral, if present) comes over as distillate. However, we do not wish to be limited by the foregoing or any other theory as to how or why the results are obtained when the novel method of our invention is employed.

In purifying crude DCA by distillation in the presence of sulfuric acid, para toluene sulphonic acid, ortho toluene sulfonic acid, or meta toluene sulphonic acid, in accordance with the present method, certain optimum conditions have been discovered. Thus, when the strength of the acid used is 65% or lower, the moisture content of the DCA distillate becomes excessive. DCA containing 3% or more water is a viscous material due to hydrate formation; DCA hydrate itself being a solid at room temperature. Such increased moisture content is undesirable since additional acid is required in the condensation to TDE to correct the water to the desired acid strength. Moreover, at the low acid strengths stated, the MCA content of the distillate is 3% or higher, unless an undesirably long reflux time is employed prior to distillation. Such content of MCA in the "purified" dichloroacetaldehyde is too high to give desirable improvements in color, set point and millability in TDE prepared therefrom.

On the other hand, acid strengths of 85% or higher when sulfuric acid is used, and 90% or higher when one of the three named toluene sulphonic acids are used; while effecting low MCA content, result in poor yields and are of no use unless very high purity DCA is desired at expense of yield. The preferable strength of sulfuric acid at which suitable grade of purified DCA for processing into TDE of desired quality is obtained in optimum yield, has been found to be 70%. The preferable strength of the toluene sulphonic acids for the same purpose is about 85%.

As a generalization, it may be stated that the ratio of sulfuric acid or toluene sulphonic acid to DCA is critical in the maximum direction, particularly when reuse of the acid residue in subsequent distillations is contemplated. In the latter case, it has been found that the acid residue may be reused at least once if the acid/DCA weight ratio is .50 or more. With respect to reuse of waste acid, however, it has been found that the water content of the distillate obtained in subsequent distillations increases appreciably. Moreover, the acid charge thickens progressively and becomes unmanageable after about three distillations.

A preferable acid/DCA weight ratio has been found to be about .40. When such ratio is employed, optimum yields of purified DCA are obtained and the residue is readily discharged from the still. At a ratio of .10, the yield of DCA falls off appreciably since the volume of acid then present appears to fail to function as a proper heel or chaser for the distillate. Moreover, under such circumstances, residue discharge and still clear-out are also difficult.

In practicing the method of the invention, it has further been found that even better results are obtained if the crude DCA and acid mixture is kept at a reflux temperature for a period of time prior to actual distillation. Such refluxing probably causes more effective polymerization of MCA present due to the aldol-type condensation that is believed to occur in the presence of the acid, as already referred to previously. The reflux time for the most desirable results with a given charge will obviously vary depending upon such other variables as acid strength, acid/DCA ratio, total volume of charge, and reflux temperature.

To demonstrate the criticality in the choice of acid used and the optimum operational conditions for the method of the invention, in regard to acid strength, acid/DCA weight ratio, reflux time prior to distillation, and pressure at which distillation should be performed, for obtaining a desirable combination of high percent DCA yield and low MCA/DCA ratio in the purified DCA; a series of 35 distillation runs was undertaken.

The apparatus used for these runs consisted of a conventional 1000 ml. 3-necked flask agitated by a paddle and a 9 inch long glass column that had a 1 inch internal diameter packed with ⅛ inch glass helices. The condenser utilized was part of the distillate take-off line. A water-cooled receiver for the distillate and a vacuum pump, manostat and manometer for pressure control during the preliminary refluxing and the distillation operation, all of conventional design, completed the system.

In each of the 35 runs the flask was freshly charged with the proportions of crude DCA and the chosen acid of the strengths designated in Table I below. Sulfuric acid was used in each of the first 30 runs and the acid used in the remaining five runs was as is designated in the table. Thereafter, in the predistillation reflux period, in every case, the flask was heated to 90–94° C. at atmospheric pressure. The column functioned as an entrainment separator and no reflux other than that produced by air-cooling of the column was introduced. The cooling effect of the unjacketed column was sufficient to condense substantially all the vapors produced except light gaseous products of decomposition, chiefly HCl. The distillation of each charge was undertaken at the respective pressure set for in Table I.

The results of the 35 runs are given in Table I below.

An arbitrary scale was established to permit a determination of how low the MCA/DCA ratio of the DCA need be to result in TDE produced therefrom of acceptable color. On this scale, zero was pure white and 200 was a very dark brown.

The distillates resulting from the foregoing runs were each separately condensed to TDE and the color of the final product noted. The results of these color determinations were charted on a graph and followed generally

TABLE I

| Run # | acid, percent | acid/DCA wt. ratio | reflux, minutes | pressure, in. Hg abs. | Percent DCA [1] yield | MCA/DCA [2] | Percent $H_2O$ in distillate [3] |
|---|---|---|---|---|---|---|---|
| 1 | 80 | .56 | 25 | 20 | 80.8 | .0054 | |
| 2 | 80 | .56 | 25 | 20 | 69.5 | .0038 | |
| 3 | 86.6 | .39 | 9 | 25 | 60.5 | .0036 | |
| 4 | 73.4 | .765 | 9 | 25 | 87.1 | .0104 | |
| 5 | 86.6 | .765 | 49 | 25 | 39.7 | .0011 | |
| 6 | 73.4 | .39 | 49 | 25 | 82.5 | .0078 | |
| 7 | 73.4 | .765 | 49 | 15 | 76.5 | .0049 | |
| 8 | 86.6 | .39 | 49 | 15 | 45.6 | .0009 | |
| 9 | 73.4 | .39 | 9 | 15 | 80.3 | .0234 | |
| 10 | 86.6 | .765 | 9 | 15 | 34.0 | .0011 | |
| 11 | 80 | .56 | 25 | 20 | 72.7 | .0024 | |
| 12 | 80 | .56 | 25 | 20 | 74.4 | .0029 | |
| 13 | 86.6 | .765 | 49 | 15 | 23.6 | .0004 | |
| 14 | 73.4 | .39 | 49 | 15 | 76.9 | .0094 | |
| 15 | 73.4 | .39 | 9 | 25 | 85.4 | .0254 | 0.7 |
| 16 | 86.6 | .765 | 9 | 25 | 57.4 | .0212 | |
| 17 | 86.6 | .39 | 9 | 15 | 68.4 | .0099 | |
| 18 | 73.4 | .765 | 9 | 15 | 80.5 | .0168 | 0.4 |
| 19 | 73.4 | .765 | 49 | 25 | 82.8 | .0128 | 0.7 |
| 20 | 86.6 | .39 | 49 | 25 | 46.8 | .0027 | |
| 21 | 80 | .25 | 25 | 20 | 82.7 | .0089 | 0.4 |
| 22 | 80 | 1.0 | 25 | 20 | 59.8 | .0019 | |
| 23 | 80 | .56 | 25 | 20 | 70.0 | .0033 | |
| 24 | 80 | .56 | 25 | 20 | 71.9 | .0022 | |
| 25 | 80 | .56 | 31 | 20 | 75.5 | .0012 | 0.3 |
| 26 | 66.8 | .56 | 25 | 20 | 87.3 | .0482 | 1.2 |
| 27 | 93.2 | .56 | 25 | 20 | 20.5 | .0019 | acid used in last 5 runs |
| 28 | 80 | .56 | 1 | 20 | 72.1 | .0083 | |
| 29 | 80 | .56 | 25 | 10 | 82.4 | .0036 | |
| 30 | 80 | .56 | 25 | 30 | 71.1 | .0032 | |
| 31 | 70 | .4 | 30 | 30 | 99.8 | .0326 | ($H_3PO_4$) |
| 32 | 85.3 | .4 | 30 | 30 | 93.4 | .0297 | ($H_3PO_4$) |
| 33 | 100 | [6].03 | 30 | 30 | 88.25 | .063 | ($P_2O_5$) |
| 34 | 100 | .4 | 30 | 30 | 91.4 | .073 | [4] (TCA) |
| 35 | 90.5 | .4 | 30 | 30 | 88.5 | .0024 | [5] (PTSA) |

[1] (DCA in distillate/DCA in charge to still)×100, as determined by gas chromatograph.
[2] MCA/DCA weight ratio in distillate as determined by gas chromatograph.
[3] As determined by Karl Fischer titration.
[4] Trichloroacetic acid.
[5] Para toluene sulphonic acid.
[6] 0.4 ratio could not be used as $P_2O_5$ caked up and could not be agitated.

by the curve shown in the single figure of the drawing. From these results it was determined that the color of the TDE product is acceptable if the MCA/DCA ratio of the distillate used in the condensation reaction is held to .018 or less.

The following examples illustrate the method of the invention, but it is to be understood that they are not intended to be limitative of the invention in any manner other than as explicitly set forth in the appended claims.

*Example I*

Conventional plant distillation apparatus was employed, comprising a packed glass-lined distillation column, a water cooled condenser, a 750 gallon glass-lined kettle equipped with the usual heat exchange jacket, agitator, thermocouple well, and piping to permit charging and emptying of the kettle without the necessity for disconnection from the system, and a 5000 gallon storage tank.

Into the kettle, there were introduced 18 separate charges of approximately 4400 lbs. each of commercially crude DCA (analyzed at 82.97% DCA) and sufficient sulfuric acid of 70% strength so that the (70% acid)/(crude DCA) weight ratio equalled .40. The exact total of the 18 charges of crude DCA equalled 79,996 lbs.

To each of the charges there was added approximately 100–300 p.p.m. of a silicone-type antifoaming agent, i.e., Dow-Corning antifoam B. Thereafter, each charge was refluxed for 30 minutes at a kettle temperature of 90–94° C., followed by distillation at atmospheric pressure at temperatures within the range of 94–125° C. Each separate distillation cycle was carried out in from 4 to 4½ hours, to produce a batch of approximately 3300 lbs. of distillate. The total distillate product for the 18 separate distillations collected in the storage tank equalled 64,736 lbs.

The composition of the distillate, as determined by gas chromatograph analysis of a sample from the total distillate collected in the storage tank after the 16th batch distillation, was as follows:

| Component | Weight percent |
|---|---|
| Water | .38 |
| MCA | 1.10 |
| DCA | 90.35 |
| Chloral | 7.59 |
| Volatile | .58 |

The percentage yield of DCA from the 18 distillations based on total DCA actually charged was 88.1%.

From the total distillate, 143,500 lbs. of TDE of excellent light color were obtained in a subsequent condensation reaction with chlorobenzene in a sulfuric acid medium. The resultant TDE pelletized in the reactor to permit easy discharge without heating. The product TDE was readily milled and left negligible deposits on the mill surfaces. The set point of the product was around 88–90° C. when condensed with a final acid strength of 98.5%, and 90.1° C. when condensed with a final acid strength of 99.5%. When crude DCA is used in the condensation reaction, however, it is necessary to heat the acid-TDE mixture prior to discharge from the TDE reactor.

To permit comparison of the color of TDE obtained when crude DCA is utilized and when DCA purified in accordance with the method of the invention is employed, the arbitrary scale previously established, on which scale, zero was pure white and 200 was a very dark brown, was used again. When crude DCA was employed in a direct condensation to produce TDE, the color of the product on the above scale was from 80–150. When distilled DCA, resulting from the foregoing 18 distillations was utilized, the actual color obtained varied from 60 to 89, the high figures being due to old dark TDE, which, in the plant operation, was being reworked along with the TDE from distilled DCA. Towards the end of the foregoing condensation run, when the amount of reworked material was diminished, the color averaged about 25.

A very marked improvement in odor was also apparent during the processing of TDE when DCA upgraded in accordance with the invention was used. Accordingly, the usual odor or lacrymation difficulties otherwise encountered during plant operations for TDE production was minimized to a noticeable extent.

When commercially obtainable crude DCA, purified in accordance with the method of the invention by distillation from $H_2SO_4$ in the preferred strength and ratio (70% and .40, respectively), is used for condensation with chlorobenzene to produce TDE; the overall yield of TDE obtained, based on DCA is 76.4%. On the other hand, when the crude DCA is condensed directly to TDE, the yield is no more than 78%, but with, of course, the attendant poor color, millability, and set point of the final product referred to hereinbefore.

It has been found that 66% Bé. $H_2SO_4$ can be added to an agitated pot containing crude DCA and water to give the desired strength in the pot suitable for the distillation operation without incurring an excessive temperature rise.

Subsequent to a purification operation, the residual sulfuric acid left in the heating kettle after the bulk of the acid is poured off, may be easily removed by a simple washing operation.

*Example II*

Utilizing conventional distilling apparatus as discussed hereinbefore, and commercially crude DCA as in Example I, there were charged in the heating container 100 parts of said DCA and 40 parts of para toluene sulfonic acid of 77% concentration. While para toluene sulfonic acid was used, either ortho toluene sulfonic acid or meta toluene sulfonic acid, or mixtures thereof, such as obtained commercially, could be substituted therefor to obtain the benefits of the invention, as will be recognized at once by those skilled in the art.

The acid-DCA mixture was refluxed for 30 minutes in the temperature range of 90–94° C. at atmospheric pressure. Thereafter, the temperature was raised and distillation begun. The maximum temperature at the end of the distillation was 121° C.

The percent DCA yield in the total distillate obtained at the end of the distillation was 94.1% with the MCA/DCA ratio at .0152. Thus, with the excellent DCA yield, there was also obtained an MCA/DCA ratio below the aforesaid .018 maximum ratio at which suitable color in TDE condensed therefrom results.

With the present method for purifying dichloroacetaldehyde, chloral, the other major impurity in crude DCA obtained commercially, is not removed. However, this is relatively unimportant, and particularly where the DCA is to be used for the production of TDE. In such case, the chloral present is condensed partially to DDT, which does not impart color to the finished TDE product. Moreover, the degree to which chloral reacts in the condensation step may be controlled by limiting the chlorobenzene/DCA ratio in the condensation. This technique is disclosed in U.S. Patent 2,788,374.

We claim:

1. A process for producing purified dichloroacetaldehyde which comprises: (A) forming a mixture comprising (1) crude dichloroacetaldehyde comprising a minor amount of underchlorinated material of the group consisting of acetaldehyde and monochloroacetaldehyde, and (2) an acid of the group consisting of sulfuric acid of from 65 to 85% concentration and para toluene sulfonic acid, meta toluene sulfonic acid, and ortho toluene sulfonic acid of from 75 to 90% concentration, with the weight ratio of (2) to (1) equalling at least 0.1; (B) heating said mixture in a temperature range not above 94° C. to cause the formation of non-volatile products from said underchlorinated material; (C) distilling said mixture at atmospheric pressure; and (D) recovering purified dichloroacetaldehyde as distillate.

2. A process for producing purified dichloroacetaldehyde which comprises: (A) forming a mixture comprising (1) crude dichloroacetaldehyde comprising a minor amount of underchlorinated material of the group consisting of acetaldehyde and monochloroacetaldehyde, and (2) an acid of the group consisting of sulfuric acid of from 65 to 85% concentration and para toluene sulfonic acid, meta toluene sulfonic acid, and ortho toluene sulfonic acid of from 75 to 90% concentration, with the weight ratio of (2) to (1) equalling at least 0.1; (B) refluxing said mixture at atmospheric pressure to cause the formation of non-volatile products from said underchlorinated material; and (C) thereafter distilling purified dichloroacetaldehyde from said mixture at atmospheric pressure.

3. A process for producing purified dichloroacetaldehyde which comprises: (A) forming a mixture comprising (1) crude dichloroacetaldehyde comprising a minor amount of underchlorinated material of the group consisting of acetaldehyde and monochloroacetaldehyde, and (2) an acid of the group consisting of sulfuric acid of from 65% to 85% concentration and para toluene sulfonic acid, meta toluene sulfonic acid, and ortho toluene sulfonic acid of from 75% to 90% concentration, with the weight ratio of (2) to (1) equalling at least 0.1; (B) maintaining said mixture in a temperature range not above 94° C. to cause the formation of non-volatile products from said underchlorinated material; and (C) thereafter recovering purified dichloroacetaldehyde from said mixture by distillation.

4. A process for producing purified dichloroacetaldehyde which comprises: (A) forming a mixture comprising (1) crude dichloroacetaldehyde comprising a minor amount of underchlorinated material of the group consisting of acetaldehyde and monochloroacetaldehyde, and (2) an acid of the group consisting of sulfuric acid of from 65% to 85% concentration and para toluene sulfonic acid, metatoluene sulfonic acid, and ortho toluene sulfonic acid, of from 75% to 90% concentration, with the weight ratio of (2) to (1) equalling at least 0.1; (B) refluxing said mixture at atmospheric pressure in the temperature range of 90–94° C. to cause the formation of non-volatile products from said underchlorinated material; and (C) thereafter distilling purified dichloroacetaldehyde from said mixture.

5. A process for producing purified dichloroacetaldehyde which comprises: (A) forming a mixture comprising (1) crude dichloroacetaldehyde comprising a minor amount of underchlorinated material of the group consisting of acetaydehyde and monochloroacetaldehyde, and (2) an acid of the group consisting of sulfuric acid of from 65% to 85% concentration and para toluene sulfonic acid, meta toluene sulfonic acid, and ortho toluene sulfonic acid, of from 75% to 90% concentration with the weight ratio of (2) to (1) equalling from .1 to 0.765; (B) heating said mixture in a temperature range not above 94° C. to cause the formation of non-volatile products from said underchlorinated material; and (C) thereafter recovering purified dichloroacetaldehyde from said mixture by distillation.

6. A process for producing purified dichloroacetaldehyde which comprises: (A) forming a mixture comprising (1) crude dichloroacetaldehyde comprising a minor amount of underchlorinated material of the group consisting of acetaldehyde and monochloroacetaldehyde, and (2) an acid of the group consisting of sulfuric acid of from 65% to 85% concentration and para toluene sulfonic acid, meta toluene sulfonic acid, and ortho toluene sulfonic acid, of from 75% to 90% concentration with the weight ratio of (2) to (1) equalling from .1 to .56; (B) refluxing said mixture in the temperature range of 90–94° C. at atmospheric pressure; and (C) thereafter recovering purified dichloroacetaldehyde from said mixture by distilling in the temperature range of 90° to 125° C. at atmospheric pressure.

7. A process for producing purified dichloroacetaldehyde which comprises: (A) forming a mixture comprising (1) crude dichloroacetaldehyde comprising a minor amount of underchlorinated material of the group consisting of acetaldehyde and monochloroacetaldehyde, and (2) an acid of the group consisting of sulfuric acid of 70% concentration and para toluene sulfonic acid, meta toluene sulfonic acid, and ortho toluene sulfonic acid, of 85% concentration with the weight ratio of (2) to (1) equalling .40; (B) refluxing said mixture for 30 minutes at atmospheric pressure at a temperature range of 90–94° C.; and (C) thereafter recovering purified dichloroacetaldehyde from said mixture by distilling at a temperature range of 90° to 125° C. at atmospheric pressure.

References Cited in the file of this patent

UNITED STATES PATENTS

| | | |
|---|---|---|
| 2,354,813 | Jenkins | Aug. 1, 1944 |
| 2,445,195 | Umhoefer | July 13, 1948 |
| 2,473,003 | Beachell et al. | June 14, 1949 |
| 2,478,152 | Cass | Aug. 2, 1949 |
| 2,478,741 | Brothman | Aug. 9, 1949 |
| 2,702,303 | Otto et al. | Feb. 15, 1955 |
| 2,759,978 | Stevens et al. | Aug. 21, 1956 |

OTHER REFERENCES

Fiat Final Report 983, The Manufacture of Chloral at I.G. Farbenindustrie A.G. Leverkusen (1946), p. 7.